United States Patent [19]

Narita et al.

[11] Patent Number: 4,604,779

[45] Date of Patent: Aug. 12, 1986

[54] METHOD OF PRODUCING A CYLINDER HEAD WITH A PORT LINER

[75] Inventors: Yoshinori Narita; Hirohisa Makino, both of Aichi, Japan

[73] Assignee: NGK Spark Plug Co., Ltd., Nagoya, Japan

[21] Appl. No.: 705,789

[22] Filed: Feb. 26, 1985

[30] Foreign Application Priority Data

Feb. 27, 1984 [JP] Japan .................................. 59-34435
Dec. 26, 1984 [JP] Japan ................................ 59-281326

[51] Int. Cl.[4] ........................ B23P 15/00; B23P 17/00; B22D 19/00

[52] U.S. Cl. .......................... 29/156.4 WL; 29/527.6; 29/DIG. 5; 60/272; 123/193 H; 164/98

[58] Field of Search .................... 29/156.4 WL, 527.5, 29/527.6, DIG. 5; 60/272, 282; 123/193 H; 164/97, 98, 107, 122

[56] References Cited

U.S. PATENT DOCUMENTS

| | | | |
|---|---|---|---|
| 1,655,149 | 1/1928 | Lee | 29/156.4 WL |
| 3,709,772 | 1/1973 | Rice | 60/272 X |
| 3,919,775 | 11/1975 | Kaneko et al. | 29/156.4 WL |
| 3,949,552 | 4/1976 | Kaneko et al. | 60/282 |
| 4,077,458 | 3/1978 | Hayashi et al. | 60/282 X |
| 4,148,352 | 4/1979 | Sensui et al. | 164/98 X |
| 4,346,556 | 8/1982 | Rice et al. | 123/193 H X |

FOREIGN PATENT DOCUMENTS

| | | | |
|---|---|---|---|
| 2602434 | 7/1977 | Fed. Rep. of Germany | 123/193 H |
| 151714 | 11/1979 | Japan | 29/156.4 WL |

*Primary Examiner*—Howard N. Goldberg
*Assistant Examiner*—R. S. Wallace
*Attorney, Agent, or Firm*—Finnegan, Henderson, Farabow, Garrett & Dunner

[57] ABSTRACT

A method for producing a cylinder head having a tubular exhaust port liner made of a ceramic material is disclosed. The method comprises providing a covering layer of refractory fibers around the outer circumference of the exhaust port liner, applying a metal cap over each end of the covered exhaust port liner and setting the covered exhaust port liner into a mold. A cylinder head then is cast around the exhaust port liner so that the portions of the metal caps contacting the cylinder head are fused to the cylinder head. The metal caps are bored out to open up the exhaust port after predetermined treatments are performed on the cylinder head.

8 Claims, 8 Drawing Figures

METHOD OF PRODUCING A CYLINDER HEAD WITH A PORT LINER

BACKGROUND OF THE INVENTION

The present invention relates to a method of producing a cylinder head provided with an exhaust port liner for an internal combustion engine, and particularly to a method of producing a cylinder head using a tubular port liner made of ceramics, and being provided with a covering layer of a refractory fiber as a heat insulating layer while the outer circumference of the layer is being cast of metal.

The present invention is intended to produce a cylinder head provided with a heat insulating port liner without damaging the port liner in the producing process and without deteriorating the heat insulating effect of a covering layer of refractory fibers.

Generally, if an internal combustion engine is improved in combustion efficiency, exhaust gas temperature is lowered, and for example, the purifying action by perfect combustion of an exhaust gas with oxidation catalyst, or the like, is degraded. Therefore it is necessary to keep the exhaust tube passage adiabatic and warm as much as possible so as not to lower the temperature of the exhaust gas.

An exhaust port liner is employed to cope with this situation, but the exhaust port portion is the place which is normally cooled by cooling water and, therefore, the deterioration in action of the purification catalyst due to temperature drop of the exhaust gas is remarkable.

In order to eliminate a disadvantage, there have been proposed a port liner in which a metal pipe made of stainless steel, or the like, is made to have a double pipe construction and another port liner in which a covering layer of refractory fibers is provided around the outer circumference thereof. The former case is insufficient in insulating effect of air between double pipes, while the latter is superior to the former case in insulating effect because it does not use metal. The latter case, however, has such disadvantages that ceramics were damaged in the producing process, or the like, and that insulating effect was deteriorated due to impregnation such as water absorption into the refractory fibers.

That is, generally, when a cylinder head is produced by hollow casting a port liner, casting is performed with core sand packed in the port liner. In this case, however, it has been impossible to avoid such accidents that the port liner made of ceramics was damaged due to thermal expansion of the core sand and that the port liner was damaged when vibrations were applied to remove the core sand out of the inside. Further, in a step after the cylinder head has been cast with metal such as, for example, an aluminum or an aluminum alloy around the port liner it is necessary to put the port liner, with the cast cylinder head into water in order to perform heat treatment such as quenching, annealing or the like, and therefore there has been such a tendency that the adiabatic effect is deteriorated because water is soaked, impregnated, and left as it is within the covering layer of refractory fibers around the ceramic port liner in the above-mentioned heat treatment step, or because inorganic and organic solutions were impregnated into the covering layer of the refractory fibers when impregnation treatment with those solutions was performed.

SUMMARY OF THE INVENTION

In order to overcome the above noted defects, according to the invention, there is provided a method of producing a cylinder head provided with a port liner comprising the steps of: providing a covering layer of refractory fibers around an outer circumference of a tubular exhaust port liner made of ceramics; setting the exhaust port liner into a mold with its inlet and outlet respectively covered by caps made of metal at respective end faces thereof; casting a cylinder head around the liner and fusing the caps with the cylinder head; opening the caps after performing predetermined treatments; and performing finishing work.

DETAILED DESCRIPTION OF THE INVENTION

Figure 1:
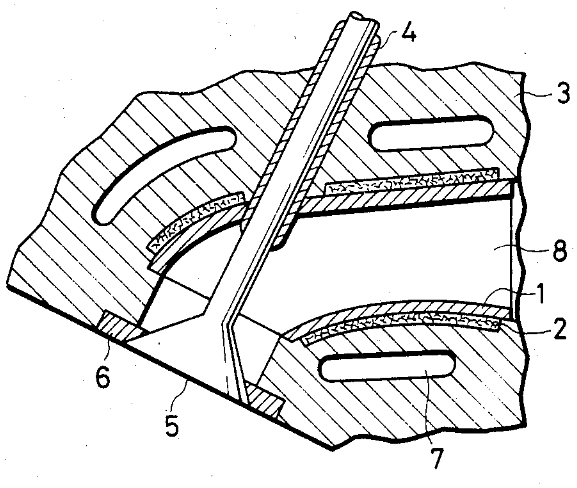
FIG. 1 PRIOR ART
FIG. 1 is a longitudinal sectional view showing an example of the conventional cylinder head with ceramic port liner.

The present invention has been attained by considering the above-mentioned situations, and referring to the drawings, the conventional products and the products produced according to the present invention will be described in detail. The same parts are designated by the same reference numerals throughout the drawings. Before explaining the invention, a conventional cylinder head will be described. FIG. 1 shows a conventional cylinder head provided with a conventional port liner in which a covering layer of refractory fibers 2 is formed at the outer circumference of a ceramic port liner 1 and a cylinder head 3 made of aluminum, iron, aluminum alloy or the like is cast at the outer circumference of the layer 2 with the covering layer 2 being used as a core. The reference numeral 4 designates a valve stem guide, 5 an exhaust valve, 6 a valve seat, 7 a cooling water passing hole, and 8 an exhaust port portion.

The method of producing this cylinder head is as described above, and, especially, the covering layer of the refractory fibers is provided on the ceramic port liner 1 with the opposite end portions thereof left by about 2 mm, so that, as described above, there frequently occur cracks at those portions and there is a tendency to arise a ceramic crack when the core sand is removed.

Figure 2:
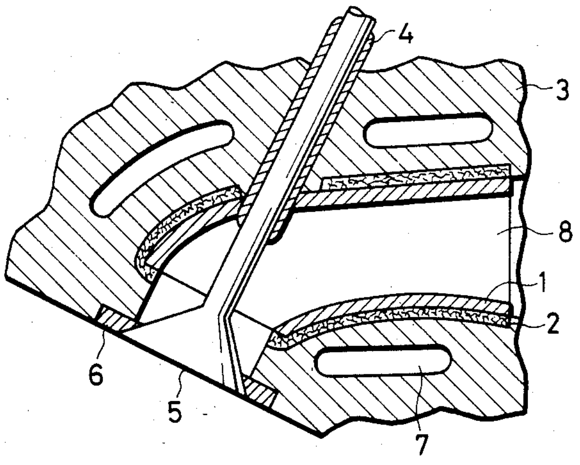
FIG. 2 is a longitudinal sectional view showing an improved covering layer made of refractory fibers.

FIG. 2 shows a cylinder head proposed by some of the inventors as a countermeasure against such drawbacks as described above, in which a ceramic port liner 1 is entirely provided with a covering layer 2 of refractory fibers, and especially, at the left end portion in the drawing, the end surface of the port liner 1 is also covered with the refractory fiber layer 2 so that it is relatively hard to arise a ceramic crack in comparison with that shown in FIG. 2. In such a cylinder head, however, there remain yet such unsolved problems that a ceramic crack may still occur due to thermal expansion of the core sand, or due to vibrations applied to remove the core sand, and that the adiabatic effect of the refractory covering layer 2 may be deteriorated due to impregnation.

Figure 3:
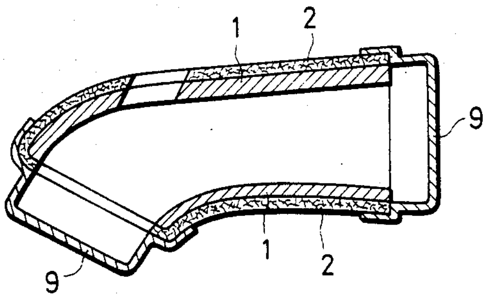
FIG. 3 is a longitudinal sectional view of a ceramic port liner covered with caps made of aluminum in performing the method according to the present invention.
Figure 4:
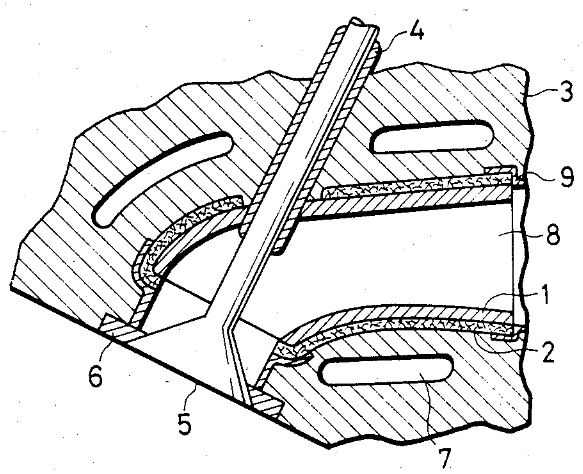
FIG. 4 is a longitudinal sectional view showing an example of the cylinder head obtained by the present invention.
Figure 5:
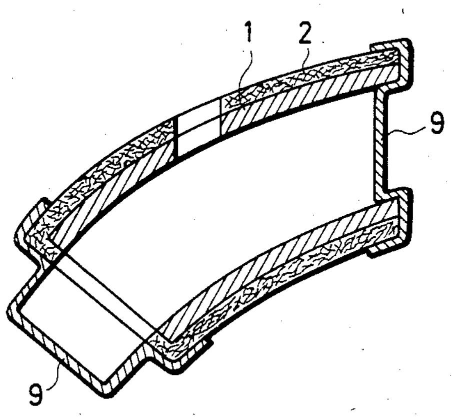
FIGS. 5, 6 and 7 are longitudinal sectional views showing other embodiments of the ceramic port liner with caps made of an aluminum alloy.
Figure 6:
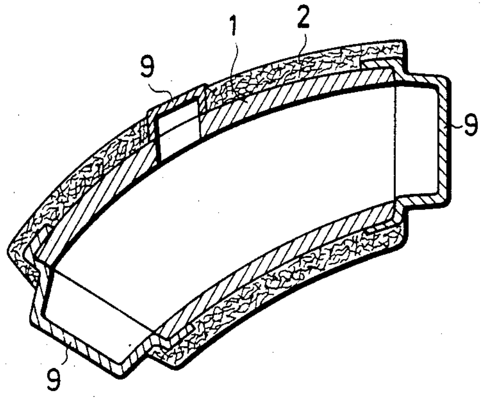
Figure 7:
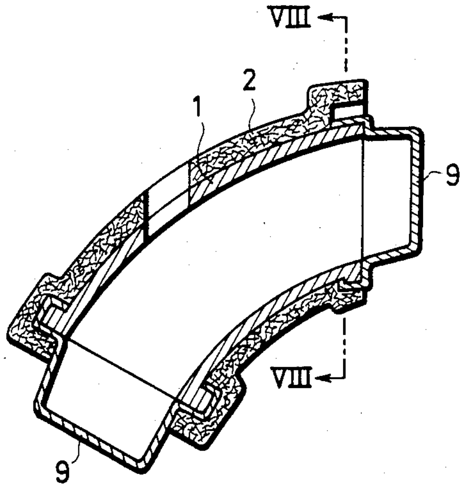
Figure 8:
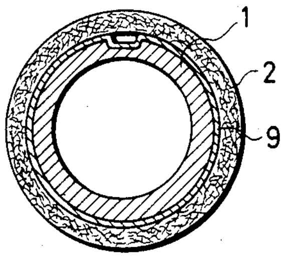
FIG. 8 is a cross-section along an VIII—VIII line of FIG. 7.

As the result of researches by the inventors in view of the circumstances as described above, provided is a method of producing a cylinder head with a port liner in which a ceramic port liner is covered with refractory fibers over the outer circumference thereof, preferably even over the end surface thereof, as shown in FIG. 3, the method comprising the steps of: closing the opposite side surfaces at both the inlet and outlet of the port liner by caps 9 made of iron, stainless steel or aluminum alloy having a melting point equal to or higher than that of material, such as aluminum alloy, to be used for casting the cylinder head; setting the port liner closed with these caps 9 in a casting mold; casting the cylinder head around the port liner and fusion welding the cylinder head with the caps at portions where the caps are in contact with molten metal bath or a part thereof; performing predetermined treatment such as quenching, annealing, or the like (this step being not shown); and opening the aluminum alloy caps 9 by boring, or the like, as shown in FIG. 4, in finishing work of the cylinder head.

Thus, it is made possible to perform hollow casting without charging core sand in the port liner, so that the producing process is simplified in its intermediate step, and not only the core sand can be saved but also a problem such as a ceramic crack due to the weight of core sand upon application of vibrations can be solved, and further, since the refractory fiber layer of the port liner is cut apart from contact with water and a solution in annealing and impregnation treatments after casting, there is no fear of impregnation such as water absorption, or the like, and, therefore, it is possible to show an excellent heat insulating effect.

As shown in FIG. 4, the outer circumference of a port liner 1 made of ceramics made mainly of aluminum titanate and having an inner diameter of 30 mm, a thickness of 1.5 mm, and a length of 100 mm, was covered with a ceramic refractory fiber layer 2 containing alumina as its principal component, caps 9 made of stainless steel and each having an inner diameter of 39 mm, a thickness of 0.3 mm, and a length of 15 mm were respectively fitted with the opposite end surfaces of the port liner, an aluminum cylinder head 3 was cast around the port liner, and necessary treatments were performed. The caps 9 were then opened by boring and a cylinder head with port liner having an excellent insulating effect could be obtained with no damage occurring in the ceramics or with no impregnation of solutions into the refractory fiber covering layer.

In the same manner, the outer circumference of a port liner made of ceramics containing aluminum titanate as its principal component and having an inner diameter of 30 mm, a thickness of 1.5 mm, and a length of 100 mm, was covered with a ceramic refractory fiber layer containing alumina as its principal component, caps 9 made of an aluminum alloy and each having an inner diameter of 39 mm, a thickness of 1.0 mm, and a length of 15 mm were respectively fitted with the opposite end surfaces of the port liner, an aluminum alloy cylinder head was cast around the port liner, and necessary treatments were performed. The caps were then opened by boring and a cylinder head with port liner having an excellent insulating effect could be obtained with no damage occurring in the ceramics or with no impregnation of solutions into the refractory fiber covering layer.

On the other hand, as shon in the FIG. 2, in case where a covering layer made of refractory fiber was formed around the outer circumference of a ceramic port liner, core sand was charged inside the port liner, and then an aluminum alloy cylinder head was cast, it was recognized that damage was generated in the ceramic port liner and a solution was impregnated into the refractory fiber covering layer, as described above.

FIGS. 5, 6, 7 and 8 show other examples of the cap 9 according to the present invention, and as long as not apart from the spirit and scope of the present invention, various modifications of the method can be performed.

We claim:

1. A method of producing a cylinder head having a tubular exhaust port liner made of a ceramic material, comprising the steps of:

providing a covering layer of refractory fibers around the outer circumference of said tubular exhaust port liner;

applying a metal cap over each end of said covered tubular exhaust port liner;

setting said covered exhaust port liner into a mold;

casting a cylinder head around said exhaust port liner and fusing to said cylinder head the portions of said metal caps contacting said cylinder head;

performing predetermined treatments on said cylinder head; and boring said metal caps after performing said predetermined treatments.

2. The method of claim 1, wherein said caps are made of a metal having a melting point equal to or higher than the melting point of the material used for casting said cylinder head.

3. The method of claim 1, wherein said metal of the caps comprises stainless steel.

4. The method of claim 2, wherein said metal of the caps comprises stainless steel.

5. The method of claim 1, wherein said metal of the caps comprises aluminum alloy.

6. The method of claim 2, wherein said metal of the caps comprises aluminum alloy.

7. The method of claim 1, further comprising the step of performing finishing work.

8. A method of producing a cylinder head having a tubular exhaust port liner made of a ceramic material, comprising the steps of:

providing a covering layer of refractory fibers around the outer circumference of said tubular exhaust port liner;

applying a metal cap over each end of said covered tubular exhaust port liner, said covering layer and said metal caps covering the entire outer surface of said port liner;

setting said covered exhaust port liner into a mold;

casting a cylinder head around said exhaust port liner and fusing to said cylinder head the portions of said metal caps contacting said cylinder head, said covering layer and metal caps preventing contact between said exhaust port liner and the material used for casting said cylinder head;

performing predetermined treatments on said cylinder head; and boring said metal caps after performing said predetermined treatments.

* * * * *